US012579983B2

(12) United States Patent
Sudo et al.

(10) Patent No.: US 12,579,983 B2
(45) Date of Patent: Mar. 17, 2026

(54) SPEECH RECOGNITION DEVICE, SPEECH RECOGNITION METHOD, AND NON-TRANSITORY COMPUTER-READABLE MEDIUM

(71) Applicant: Honda Motor Co., Ltd., Tokyo (JP)

(72) Inventors: Yui Sudo, Saitama (JP); Kazuhiro Nakadai, Saitama (JP); Kazuya Hata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 18/453,338

(22) Filed: Aug. 22, 2023

(65) Prior Publication Data

US 2024/0096330 A1     Mar. 21, 2024

(30) Foreign Application Priority Data

Sep. 20, 2022    (JP) ................................. 2022-149204

(51) Int. Cl.
    *G10L 15/26*       (2006.01)
    *G06F 40/166*      (2020.01)

(52) U.S. Cl.
    CPC ............ *G10L 15/26* (2013.01); *G06F 40/166* (2020.01)

(58) Field of Classification Search
None
See application file for complete search history.

(56) References Cited

U.S. PATENT DOCUMENTS

| | | | | | |
|---|---|---|---|---|---|
| 5,033,087 | A | * | 7/1991 | Bahl | ...................... G10L 15/14 |
| | | | | | 704/256.5 |
| 5,729,656 | A | * | 3/1998 | Nahamoo | ............... G10L 15/04 |
| | | | | | 704/E15.005 |
| 9,934,777 | B1 | * | 4/2018 | Joseph | ................... G10L 15/22 |
| 12,045,288 | B1 | * | 7/2024 | Barut | ................... G06F 16/532 |

(Continued)

FOREIGN PATENT DOCUMENTS

| | | |
|---|---|---|
| JP | 2010085536 | 4/2010 |
| JP | 2013218095 | 10/2013 |

(Continued)

OTHER PUBLICATIONS

"Office Action of Japan Counterpart Application", issued on Oct. 7, 2025, with English translation thereof, p. 1-p. 6.

*Primary Examiner* — Neeraj Sharma
(74) *Attorney, Agent, or Firm* — JCIPRNET

(57) ABSTRACT

A speech recognition device includes: an acquisition part, acquiring a speech signal; a speech feature amount calculation part, calculating a speech feature amount; a first speech recognition part, based on the speech feature amount, performing speech recognition using a learned first E2E model, attaching a first tag to a vocabulary portion of a specific class in text that is a recognition result, and outputting the same; a second speech recognition part, based on the speech feature amount, performing speech recognition using a learned second E2E model, attaching a second tag to a vocabulary portion of a specific class in a phoneme that is a recognition result, and outputting the same; a phoneme replacement part, replacing a vocabulary with the first tag with a phoneme with the second tag; and an output part, converting the phoneme with the second tag into text and outputting the same.

10 Claims, 5 Drawing Sheets

(56) References Cited

U.S. PATENT DOCUMENTS

| | | | |
|---|---|---|---|
| 2002/0116192 A1* | 8/2002 | Shozakai | G10L 15/063 |
| | | | 704/E15.032 |
| 2004/0111259 A1* | 6/2004 | Miller | G10L 15/19 |
| | | | 704/E15.044 |
| 2007/0239444 A1* | 10/2007 | Ma | G10L 15/20 |
| | | | 704/E15.039 |
| 2011/0196678 A1* | 8/2011 | Hanazawa | G10L 15/187 |
| | | | 704/251 |
| 2014/0278372 A1 | 9/2014 | Nakadai et al. | |
| 2015/0088506 A1 | 3/2015 | Obuchi et al. | |
| 2016/0240188 A1* | 8/2016 | Seto | G10L 15/32 |
| 2016/0300566 A1* | 10/2016 | Hofer | G10L 15/08 |
| 2017/0270919 A1 | 9/2017 | Parthasarathi et al. | |
| 2018/0233150 A1 | 8/2018 | Gruenstein et al. | |
| 2019/0304465 A1 | 10/2019 | Gruenstein et al. | |
| 2020/0035231 A1 | 1/2020 | Parthasarathi et al. | |
| 2020/0298873 A1* | 9/2020 | Provost | G10L 15/22 |
| 2020/0365158 A1 | 11/2020 | Gruenstein et al. | |
| 2021/0287678 A1 | 9/2021 | Gruenstein et al. | |
| 2022/0108699 A1 | 4/2022 | Amakasu et al. | |
| 2023/0298566 A1* | 9/2023 | Li | G10L 15/16 |
| | | | 704/232 |
| 2023/0343340 A1 | 10/2023 | Gruenstein et al. | |
| 2024/0412734 A1 | 12/2024 | Gruenstein et al. | |

FOREIGN PATENT DOCUMENTS

| | | |
|---|---|---|
| JP | 2014178886 | 9/2014 |
| JP | 2019514045 | 5/2019 |
| JP | 2020507815 | 3/2020 |
| JP | 2020126185 | 8/2020 |
| JP | 2021501376 | 1/2021 |

* cited by examiner

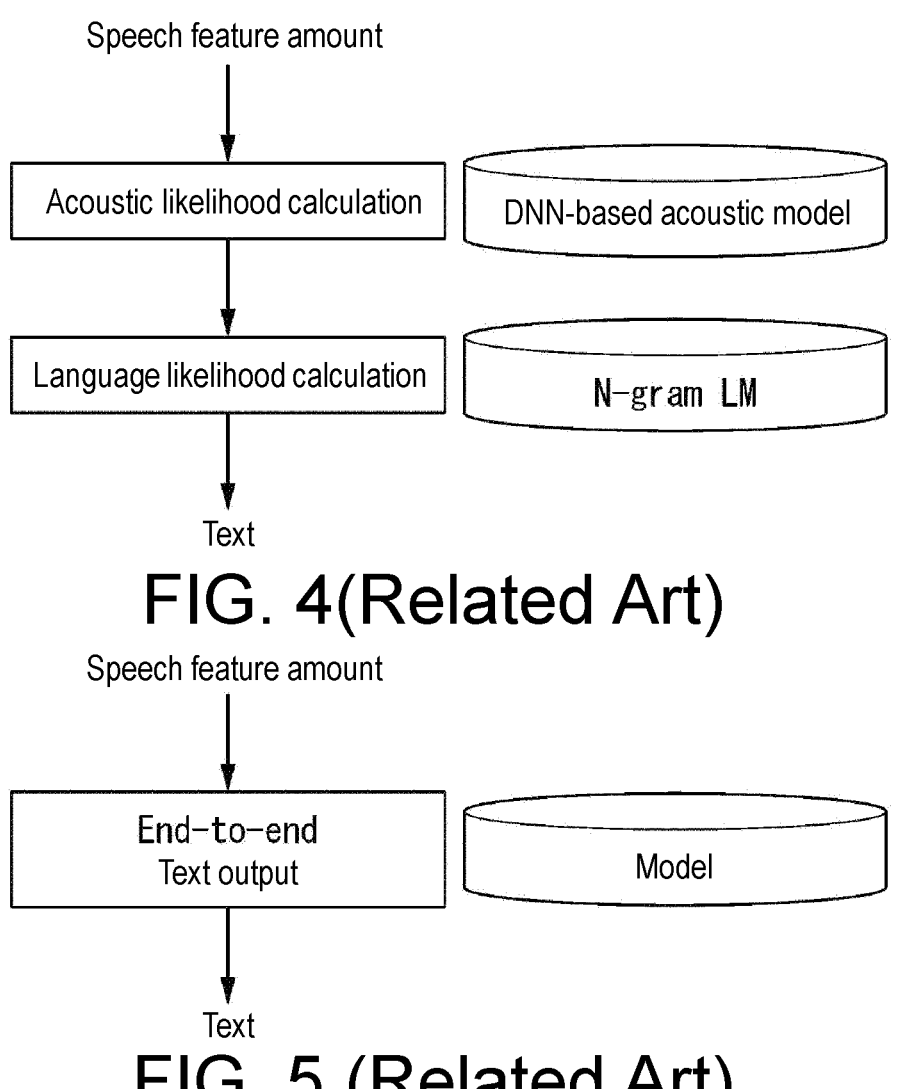

Speech feature amount

Acoustic likelihood calculation

DNN-based acoustic model

Language likelihood calculation

N-gram LM

Text

FIG. 4(Related Art)

Speech feature amount

End-to-end
Text output

Model

Text

FIG. 5 (Related Art)

| Total number of utterances | 1097 |
|---|---|
| Parts of persons' names | 68 parts (32 parts unlearned) |
| Number of persons' names | 33 persons (15 persons unlearned) |
| Threshold | 0. 0~1. 0 |
| LM within class | 15 persons, 33 persons, 133 persons |

FIG. 6

| Method | List of persons' names | Threshold r | Total CER | Class CER | Outside class CER |
|---|---|---|---|---|---|
| DNN-HMM (term list available) | – | – | 13.4 | 23.6 | 13.4 |
| E2E baseline (text with class tag remains) | – | – | 9.9 | 48.6 | 9.6 |
| Method of embodiment | 33 persons | 0.0 | 9.6 | 27.9 | 9.6 |
| | | 0.5 | 9.6 | 27.9 | 9.6 |
| | | 0.8 | 9.6 | 28.6 | 9.6 |
| | | 1.0 | 9.7 | 35.7 | 9.6 |
| | 15 persons | 0.0 | 10.1 | 68.6 | 9.6 |
| | | 0.5 | 10.0 | 65.7 | 9.6 |
| | | 0.8 | 9.7 | 40.0 | 9.6 |
| | | 1.0 | 9.7 | 40.0 | 9.6 |
| | 133 persons | 0.5 | 9.6 | 30.7 | 9.6 |
| | | 0.8 | 9.6 | 29.3 | 9.6 |

FIG. 7

SPEECH RECOGNITION DEVICE, SPEECH RECOGNITION METHOD, AND NON-TRANSITORY COMPUTER-READABLE MEDIUM

CROSS-REFERENCE TO RELATED APPLICATION

This application claims the priority benefit of Japanese patent application serial No. 2022-149204, filed on Sep. 20, 2022. The entirety of the above-mentioned patent application is here by incorporated by reference herein and made a part of this specification.

BACKGROUND

Technical Field

The disclosure relates to a speech recognition device, a speech recognition method, and a program.

Related Art

In speech recognition technology, end-to-end (E2E) models are drawing attention in place of conventional deep neural network-hidden Markov models (DNN-HMIMs). In deep learning using an E2E model, a machine learning system in which multi-stage processing is required between data input and result output is replaced with one large neural network including multiple layers and modules that perform various processings, and learning is performed.

In a DNN-HMM model, since an acoustic model and a language model are connected in cascade and processing is performed, there is a problem that errors are accumulated. On the other hand, it has been reported that the E2E model outputs text directly from a speech feature amount and is therefore optimized as a whole and improved in recognition rate (see, for example, Published Japanese Translation of PCT Application No. 2021-501376).

However, in the E2E model described in the related art, in order to recognize a word that does not appear often, such as a person's name, relearning is necessary for the entire model since no dictionary is used, and there is no way to easily register a person's name or a term.

SUMMARY

A speech recognition device according to one aspect of the disclosure includes: an acquisition part, acquiring a speech signal; a speech feature amount calculation part, calculating a speech feature amount of the acquired speech signal; a first speech recognition part, based on the speech feature amount, performing speech recognition using a first end-to-end model that has been learned, attaching a first tag to a vocabulary portion of a specific class in text that is a recognition result, and outputting the same; a second speech recognition part, based on the speech feature amount, performing speech recognition using a second end-to-end model that has been learned, attaching a second tag to a vocabulary portion of a specific class in a phoneme that is a recognition result, and outputting the same; a phoneme replacement part, replacing a vocabulary with the first tag in the text recognized by the first speech recognition part with a phoneme with the second tag; and an output part, converting the phoneme with the second tag obtained by replacement by the phoneme replacement part into text and outputting the same.

A speech recognition method according to one aspect of the disclosure includes the following. A speech signal is acquired by an acquisition part. A speech feature amount of the acquired speech signal is calculated by a speech feature amount calculation part. Based on the speech feature amount, speech recognition is performed by a first speech recognition part using a first end-to-end model that has been learned, and a first tag is attached to a vocabulary portion of a specific class in text that is a recognition result and outputted by the first speech recognition part. Based on the speech feature amount, speech recognition is performed by a second speech recognition part using a second end-to-end model that has been learned, and a second tag is attached to a vocabulary portion of a specific class in a phoneme that is a recognition result and outputted by the second speech recognition part. A vocabulary with the first tag in the text recognized by the first speech recognition part is replaced with a phoneme with the second tag by a phoneme replacement part. The phoneme with the second tag obtained by replacement by the phoneme replacement part is converted into text and outputted by an output part.

A non-transitory computer-readable medium according to one aspect of the disclosure stores a program that causes a computer to: acquire a speech signal; calculate a speech feature amount of the acquired speech signal; based on the speech feature amount, perform speech recognition using a first end-to-end model that has been learned, attach a first tag to a vocabulary portion of a specific class in text that is a recognition result, and output the same; based on the speech feature amount, perform speech recognition using a second end-to-end model that has been learned, attach a second tag to a vocabulary portion of a specific class in a phoneme that is a recognition result, and output the same; replace a vocabulary with the first tag in the text recognized using the first end-to-end model with a phoneme with the second tag; and convert the phoneme with the second tag obtained by replacement into text and output the same.

BRIEF DESCRIPTION OF THE DRAWINGS

FIG. 4 is for describing an example of speech recognition using a DNN-HMM model in a conventional method.

FIG. 5 is for describing an example of speech recognition in the case of E2E in a conventional method.

FIG. 6 illustrates an evaluation condition.

FIG. 7 illustrates an example of an evaluation result.

DESCRIPTION OF THE EMBODIMENTS

Figure 1:
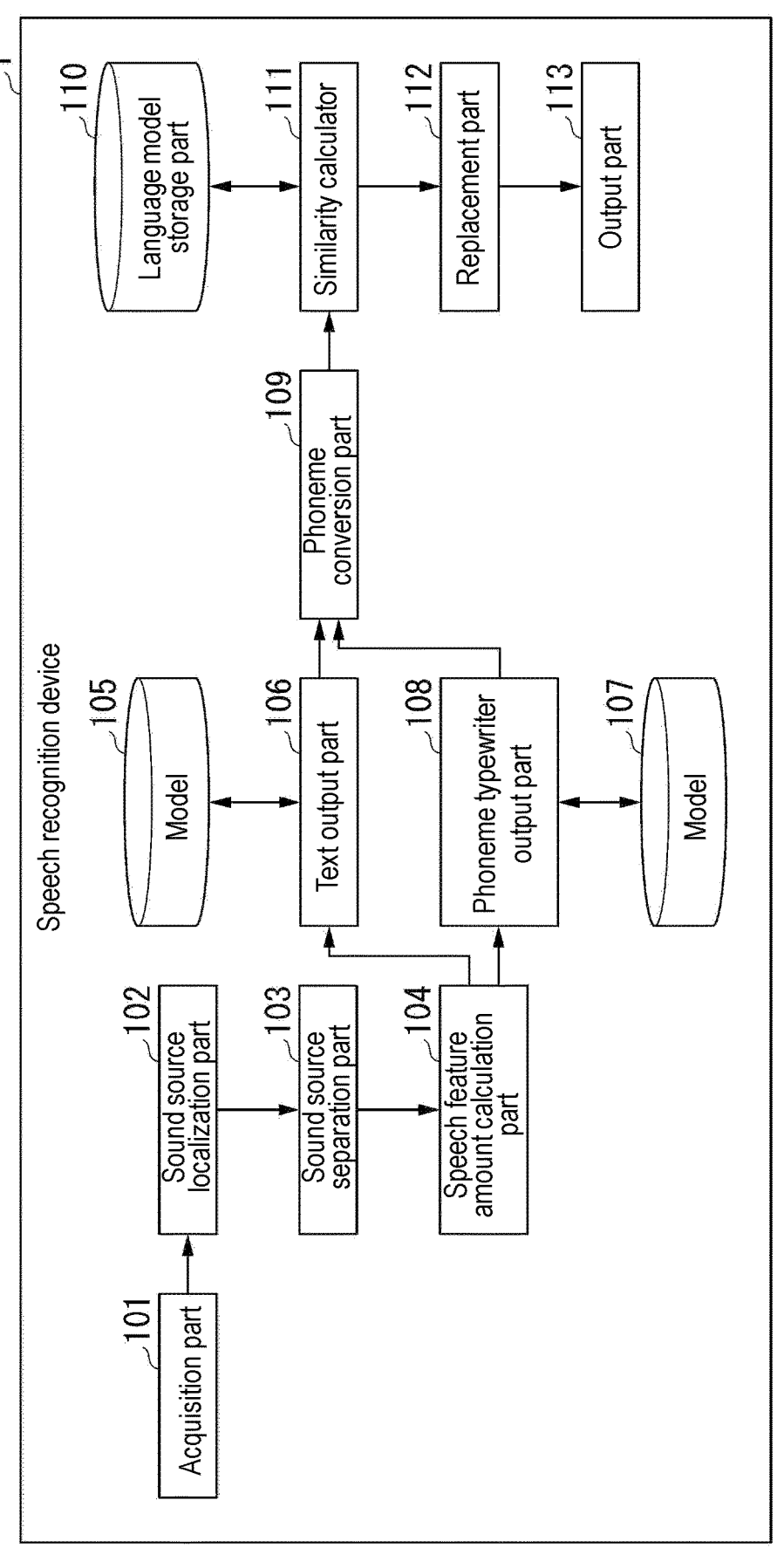
FIG. 1 illustrates a configuration example of a speech recognition device according to an embodiment.

The disclosure provides a speech recognition device, a speech recognition method, and a program in which a recognition rate can be improved even if there is an unregistered term in speech recognition of an E2E model.

(1) A speech recognition device according to one aspect of the disclosure includes: an acquisition part, acquiring a speech signal; a speech feature amount calculation part, calculating a speech feature amount of the acquired speech signal; a first speech recognition part, based on the speech feature amount, performing speech recognition using a first end-to-end model that has been learned, attaching a first tag to a vocabulary portion of a specific class in a text that is a recognition result, and outputting the vocabulary portion with the first tag; a second speech recognition part, based on the speech feature amount, performing speech recognition using a second end-to-end model that has been learned, attaching a second tag to a vocabulary portion of a specific class in a phoneme that is a recognition result, and outputting the phoneme with the second tag; a phoneme replacement part, replacing the vocabulary portion with the first tag in the text recognized by the first speech recognition part with a phoneme with the second tag; and an output part, converting the phoneme with the second tag obtained by replacement by the phoneme replacement part into a text and outputting the converted text.

(2) A speech recognition device according to one aspect of the disclosure is as follows. In the speech recognition device as described in (1), the output part converts the phoneme with the second tag obtained by replacement by the phoneme replacement part into a text with a highest similarity in a language model in which text and phonemes are associated.

(3) A speech recognition device according to one aspect of the disclosure is as follows. In the speech recognition device as described in (1), when the text with highest similarity in a language model in which text and phonemes are associated has the similarity greater than a threshold, the output part converts and outputs the phoneme with the second tag obtained by replacement by the phoneme replacement part; when the text with highest similarity in a language model stored in a language model storage part has the similarity equal to or less than a threshold, the output part outputs the phoneme with the second tag obtained by replacement by the phoneme replacement part as the text with the first tag recognized by the first speech recognition part as it is.

(4) A speech recognition device according to one aspect of the disclosure is as follows. In the speech recognition device as described in any of (1) to (3), the first end-to-end model is learned using a speech signal and text data for each utterance unit, and the second end-to-end model is learned using a speech signal and phoneme data for each utterance unit.

(5) A speech recognition device according to one aspect of the disclosure is as follows. In the speech recognition device as described in any of (1) to (4), when there are a plurality of vocabulary portions of the specific class with the first tag in the text outputted by the first speech recognition part, the phoneme replacement part replaces a first vocabulary portion of the specific class with the first tag with the phoneme with the second tag.

(6) A speech recognition device according to one aspect of the disclosure is as follows. In the speech recognition device as described in any of (1) to (5), the vocabulary portion of the specific class is at least one proper noun of a person's name, a department name, a product name, a model name, a part name, and a place name.

(7) A speech recognition method according to one aspect of the disclosure includes the following. A speech signal is acquired by an acquisition part. A speech feature amount of the acquired speech signal is calculated by a speech feature amount calculation part. Based on the speech feature amount, speech recognition is performed by a first speech recognition part using a first end-to-end model that has been learned, and a first tag is attached to a vocabulary portion of a specific class in a text that is a recognition result and outputted by the first speech recognition part. Based on the speech feature amount, speech recognition is performed by a second speech recognition part using a second end-to-end model that has been learned, and a second tag is attached to a vocabulary portion of a specific class in a phoneme that is a recognition result and outputted by the second speech recognition part. The vocabulary portion with the first tag in the text recognized by the first speech recognition part is replaced with a phoneme with the second tag by a phoneme replacement part. The phoneme with the second tag obtained by replacement by the phoneme replacement part is converted into a text and outputted by an output part.

(8) A program according to one aspect of the disclosure causes a computer to: acquire a speech signal; calculate a speech feature amount of the acquired speech signal; based on the speech feature amount, perform speech recognition using a first end-to-end model that has been learned, attach a first tag to a vocabulary portion of a specific class in text that is a recognition result, and output the vocabulary portion with the first tag; based on the speech feature amount, perform speech recognition using a second end-to-end model that has been learned, attach a second tag to a vocabulary portion of a specific class in a phoneme that is a recognition result, and output the phoneme with the second tag; replace the vocabulary portion with the first tag in the text recognized using the first end-to-end model with the phoneme with the second tag; and convert the phoneme with the second tag obtained by replacement into a text and output the converted text.

According to (1) to (8), the recognition rate can be improved even if there is an unregistered term in speech recognition of the E2E model.

Hereinafter, an embodiment of the disclosure will be described with reference to the drawings. In the drawings used for the following description, the scale of each member is appropriately changed so that each member has a recognizable size.

In all the drawings for describing the embodiment, the same reference numerals are used for elements having the same function, and repeated descriptions are omitted.

The expression "based on XX" as used herein means "based on at least XX", and also includes cases based on other elements in addition to XX. The expression "based on XX" includes not only cases of directly using XX, but also cases of being based on a result obtained by subjecting XX to calculation or processing. "XX" is an arbitrary element (for example, arbitrary information).

Configuration Example of Speech Recognition Device

FIG. 1 illustrates a configuration example of a speech recognition device according to the present embodiment. As illustrated in FIG. 1, a speech recognition device 1 includes an acquisition part 101, a sound source localization part 102, a sound source separation part 103, an speech feature amount calculation part 104, a model 105 (first end-to-end model), a text output part 106 (first speech recognition part), a model 107 (second end-to-end model), a phoneme typewriter output part 108 (second speech recognition part), a phoneme conversion part 109, a language model storage part 110, a similarity calculator 111 (output part), a replacement part 112 (output part), and an output part 113. In the case where a speech signal to be acquired contains utterances of a single speaker, the speech recognition device 1 does not have to include a sound source localization part and a sound source separation part.

The acquisition part 101 acquires a speech signal. The speech signal may be collected by, for example, a microphone array.

Based on speech signals of M channels assigned with a microphone array number and outputted by the acquisition part 101, the sound source localization part 102 determines a direction of each sound source for each frame of a predetermined length (for example, 20 ms) (sound source localization). In the sound source localization, the sound source localization part 102 calculates a spatial spectrum indicating power in each direction by using, for example, a multiple signal classification (MUSIC) method. The sound source localization part 102 determines a sound source direction for each sound source based on the spatial spectrum. The sound source localization part 102 may calculate the sound source localization using other methods such as a weighted delay-and-sum beamforming (WDS-BF) method, instead of using the MUSIC method.

The sound source separation part 103 acquires sound source direction information assigned with a sound source ID (identification information) and outputted by the sound source localization part 102 and the speech signals of M channels outputted by the acquisition part 101. Based on the sound source direction indicated by the sound source direction information, the sound source separation part 103 separates the speech signals of M channels into speech signals by sound source (separated sounds) which are speech signals indicating components for each sound source. When separating the speech signals into the speech signals by sound source, the sound source separation part 103 uses, for example a geometric-constrained high-order decorrelation-based source separation (GHDSS) method. The sound source separation part 103 obtains a spectrum of the separated speech signals. The speech recognition device 1 may include an utterance section detector. In the case where the utterance section detector is provided, the utterance section detector may detect an utterance section (utterance start time and utterance end time) based on the sound source direction information outputted by the sound source localization part 102 and the speech signals of M channels outputted by the acquisition part 101. The sound source separation part 103 may also separate the sound sources using the utterance section (utterance start time and utterance end time) detected by the utterance section detector. The sound source separation part 103 may regard a section in which the magnitude of the speech signal is equal to or greater than a predetermined value as the utterance section.

The speech feature amount calculation part 104 calculates a speech feature amount for each sound source from the spectrum outputted by the sound source separation part 103. The speech feature amount calculation part 104 calculates the speech feature amount by, for example, calculating a static mel-scale log spectrum (MSLS), a delta MSLS and one delta power every predetermined time (for example, 10 ms). The MSLS is obtained by performing an inverse discrete cosine transform on a mel-frequency cepstrum coefficient (MFCC) using a spectral feature amount as a feature amount of a speech signal.

The model 105 is a learning model for speech recognition, and is, for example, an open-source ESPnet (https://kan-bayashi.github.io/asj-espnet2-tutorial/) model. The model 105 performs learning in advance using a dataset of pairs of speech signals and text in which a class word (for example, a proper noun such as person's name, department name, product name, model name, part name, and place name) for which customization is desired is tagged.

The text output part 106 outputs text with a class tag (first tag) by inputting a speech feature amount to the model 105.

The model 107 is a learning model for speech recognition, and is, for example, an open-source ESPnet model. The model 107 creates learning data of a phoneme sequence from yomigana (Japanese phonetic characters) of text and performs model learning.

The phoneme typewriter output part 108 outputs a phoneme typewriter with a class tag (second tag) by inputting a speech feature amount to the model 107.

The phoneme conversion part 109 converts the notation within the first tag < > of the text with the class tag into a corresponding phoneme sequence of the second tag.

The language model storage part 110 stores text and phonemes within a class in association with each other. For example, the language model storage part 110 stores the text <Tanaka> in association with the phoneme <tanaka> and the text <Hatanaka> in association with the phoneme <hatanaka>.

The similarity calculator 111 compares the converted phoneme sequence with the phoneme sequences stored in the language model storage part 110 one by one. For example, the similarity calculator 111 calculates a ratio between a number of matching phonemes included in the phoneme sequence and a total number of the phonemes as similarity (0 to 1).

The replacement part 112 determines whether to replace the phoneme sequence based on the calculated similarity. For example, the replacement part 112 converts the phoneme sequence into notation of a person's name of which similarity r is the greatest and exceeds a threshold. If the similarity r is equal to or less than the threshold, the replacement part 112 performs no replacement and adopts the output of the text with the class tag. The threshold is, for example, 0.8. The threshold is an example, and may be set according to usage, class word or the like.

The output part 113 outputs text as a result of speech recognition to an external device (such as a display device, a printing device, a computer, and a mobile terminal). For example, the output part 113 may have the functions of the similarity calculator 111 and the replacement part 112.

The speech recognition device 1 performs learning and speech recognition for each utterance unit (for example, one utterance section).

Example of Speech Recognition Processing

Next, an example of speech recognition processing according to the present embodiment is described.

Figure 2:
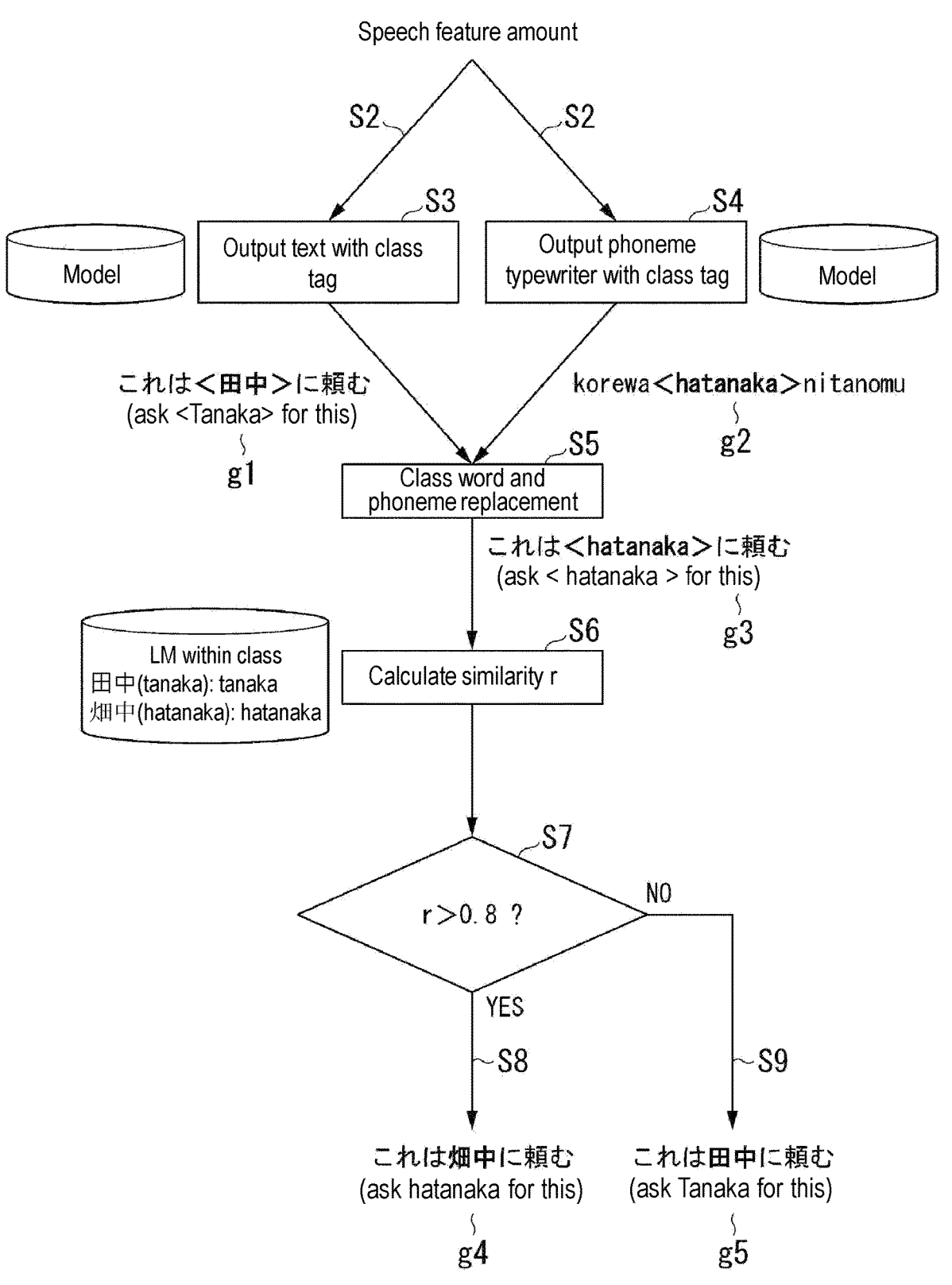
FIG. 2 is for describing an example of speech recognition processing according to an embodiment.
Figure 3:
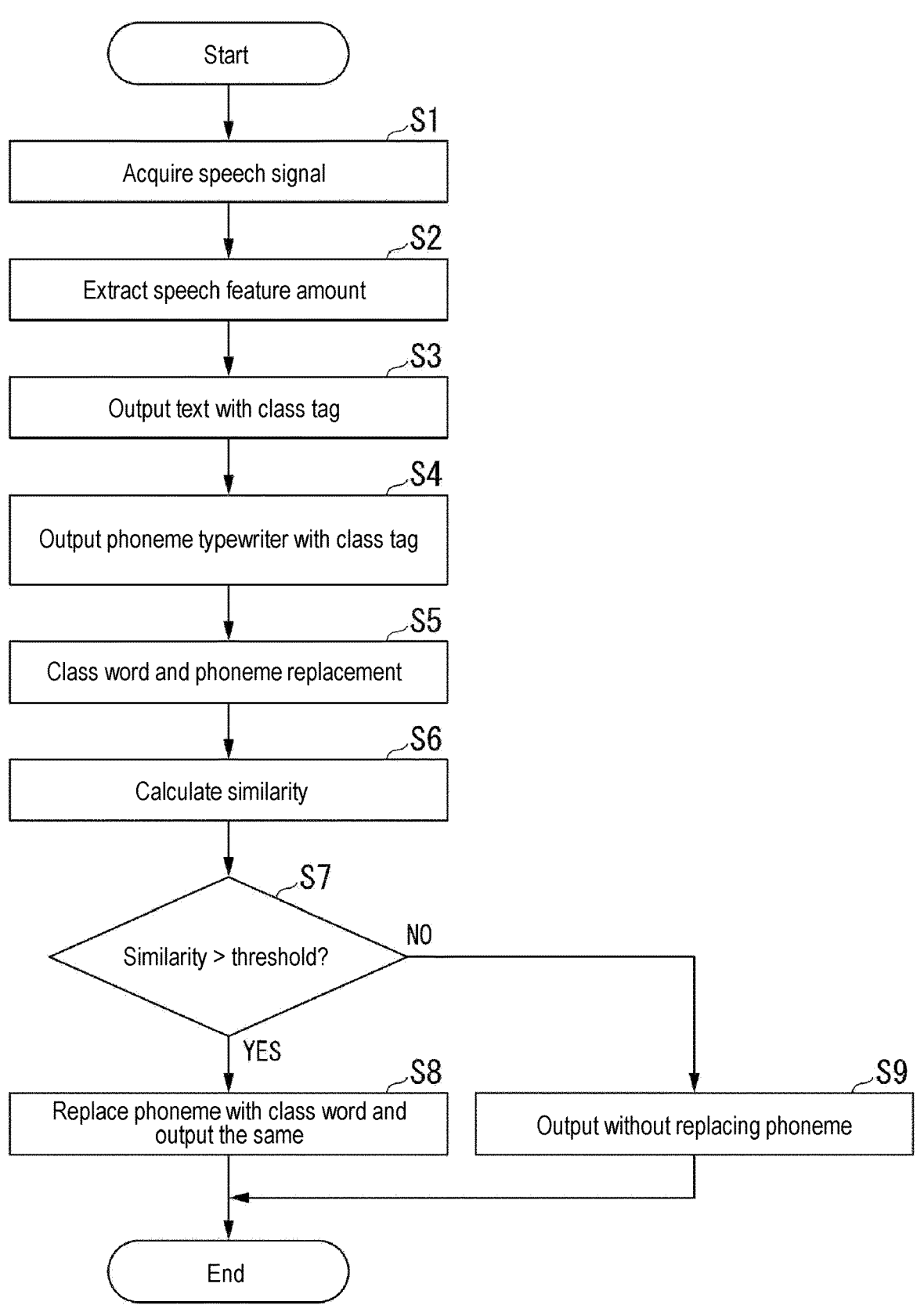
FIG. 3 is a flowchart of speech recognition processing according to an embodiment.

FIG. 2 is for describing an example of speech recognition processing according to the present embodiment. FIG. 3 is a flowchart of speech recognition processing according to the present embodiment.

(Step S1) The acquisition part 101 acquires a speech signal.

(Step S2) The speech feature amount calculation part 104 calculates a speech feature amount of the acquired speech signal and outputs the same to the text output part 106 and the phoneme typewriter output part 108.

(Step S3) The text output part 106 outputs text with a class tag by inputting a speech feature amount to the model 105. For example, if a speech recognition result in the model 105 is a Japanese sentence " これは田中に頼む (ask Tanaka for this)" (the sentence is pronounced as "korewa tanaka ni tanomu" and means "ask Tanaka for this" in English), the text output part 106 assigns a class tag to "田中 (Tanaka)" (pronounced as "tanaka" in Japanese) recognized as a person's name, and outputs " これは<田中>に頼む (ask <Tanaka> for this)" (g1).

(Step S4) The phoneme typewriter output part 108 outputs a phoneme typewriter with a class tag by inputting a speech feature amount to the model 107. For example, if a phoneme recognition result in the model 107 is "korewahatanakanitanomu", the phoneme typewriter output part 108 assigns a class tag to the phoneme "hatanaka" of a person's name and outputs "korewa<hatanaka>nitanomu" (g2).

(Step S5) The phoneme conversion part 109 converts the notation within < > of the text with the class tag into a corresponding phoneme sequence. For example, if the text output is "これは<田 中>に頼む (ask <Tanaka> for this)" and the phoneme typewriter output is "korewa<hatanaka>nitanomu", the phoneme conversion part 109 replaces the content with "これ は<hatanaka>に頼む (ask <hatanaka > for this)" (g3).

(Step S6) The similarity calculator 111 compares the converted phoneme sequence with phoneme sequences stored in the language model storage part 110 one by one. For example, the similarity calculator 111 calculates a ratio between a number of matching phonemes included in the phoneme sequence and a total number of phonemes as the similarity r (0 to 1).

(Step S7) The replacement part 112 determines whether the similarity r is greater than a threshold. If the similarity r is greater than the threshold (step S7: YES), the replacement part 112 proceeds to the processing of step S8. If the similarity r is equal to or less than the threshold (step S7: NO), the replacement part 112 proceeds to the processing of step S9.

(Step S8) If the similarity r is greater than the threshold, the replacement part 112 replaces the phoneme with a class word stored in the language model storage part 110, and outputs the same from the output part 113. For example, if the similarity r is 0.9, the replacement part 112 replaces the phoneme with a person's name stored in the language model storage part 110, and outputs " これは畑中に頼む (ask hatanaka for this)" (g4) from the output part 113. In this case, "畑中 (hatanaka)" is a Japanese name and pronounced as "hatanaka".

(Step S9) If the similarity r is equal to or less than the threshold, the replacement part 112 outputs the phoneme from the output part 113 without replacing the phoneme with a class word stored in the language model storage part 110. For example, if the similarity r is 0.7, the replacement part 112 outputs " これは田中に頼む (ask Tanaka for this)" (g5) from the output part 113 without replacing the phoneme with a person's name stored in the language model storage part 110.

In FIG. 3, for example, the processing of steps S3 and S4 may be performed in parallel or may be performed in a time-division manner.

In the processing described above, the replacement part 112 may, for example, select a class word (vocabulary) with highest similarity and output the same to the output part 113, without making a comparison between similarity and threshold.

In this way, in the present embodiment, an E2E model is caused to learn using a tagged learning dataset so that a vocabulary portion of a specific class can be distinguished from a speech feature amount. In the present embodiment, the vocabulary portion of the specific class may be output as a phoneme, and the text corresponding to the phoneme may be estimated using a dictionary. In the present embodiment, the estimated text may be inserted into a speech recognition result in the E2E model.

Accordingly, according to the present embodiment, a recognition rate can be improved even if there is a term that is not registered in the speech recognition of the E2E model.

In the case where a single utterance contains multiple class words, the phoneme conversion part 109, for example, performs conversion into phonemes from left to right. For example, if the text output is "佐藤 (sato)><畑中 (hatanaka)>" ("佐藤 " is also a Japanese name and pronounced as "sato") and the phoneme typewriter output is "<hatanaka>", the phoneme conversion part 109 converts the text <佐藤 (sato)> into the phoneme <hatanaka> and does not convert <畑中 (hatanaka)>.

Depending on the value of the similarity, the output part 113 may present both a result of output by text and text written in kanji (Chinese characters) based on output by phoneme. In such a case, a user (utterance) may select an appropriate one, and the speech recognition device 1 may store the selected results in association in the language model storage part 110. Alternatively, depending on the value of the similarity, the output part 113 may present a class word recognized by phoneme in, for example, "katakana" or "hiragana" (both Japanese syllabaries). The output part 113 may present the calculated similarity.

[Model in Conventional Method]

Here, a model in a conventional method is described.

FIG. 4 is for describing an example of speech recognition using a DNN-HMM model in a conventional method. The example of FIG. 4 uses a DNN-based acoustic model, a pronunciation dictionary, and an N-gram language model. Hence, if a new term is desired to be registered, relatively easy customization is possible by registering the new term in the pronunciation dictionary or by relearning a text portion of the N-gram language model.

FIG. 5 is for describing an example of speech recognition in the case of E2E in a conventional method. As illustrated in FIG. 5, in the case where E2E is used, there is no concept of a dictionary in the model. Hence, if a new term is desired to be registered, it is necessary for the entire model to relearn using a large number of pairs of speech signals containing the new term and text using the new term, and easy customization is not possible.

In contrast, in the present embodiment, as described above, a recognition result using the E2E model may be outputted with a class tag attached. In the output of the conventional E2E, since a class tag is dependent, it is unknown which text in the output text is, for example, a person's name or a proper noun.

Hence, in the present embodiment, a class word (a person's name or a proper noun according to usage) may be learned in advance, and the class word may be tagged and outputted. Furthermore, in the present embodiment, two E2E models may be used so that the class word in the text is tagged in one model and the class word in the phoneme indicating the pronunciation is tagged in the other model.

In the present embodiment, in these two recognition results, the class word in the text may be replaced with a phoneme sequence.

Furthermore, in the present embodiment, in order to estimate what kind of kanji a class word recognized as a phoneme is written in, a class word written in kanji with the highest similarity in phoneme (pronunciation) may be extracted with reference to a pre-learned language model within a class.

In the present embodiment, for example, the class word with the highest similarity may be extracted. Furthermore, if the similarity is greater than the threshold, replacement may be performed and a result thereof may be outputted; if the similarity is equal to or less than the threshold, a result of text output may be outputted with no replacement being performed. According to the present embodiment, by comparing the similarity with the threshold, in the case where a phoneme is not correctly recognized or a class word to be recognized is not registered in a language model, since the similarity has a small value, output of such an error can be prevented. Accordingly, according to the present embodiment, appropriate speech recognition is possible even for a class word that has not been learned in the E2E model.

[Evaluation Result]

Next, an evaluation result of the speech recognition method of the present embodiment described above is described.

FIG. 6 illustrates an evaluation condition. As illustrated in FIG. 6, the total number of utterances used in an evaluation was 1097, the number of parts of persons' names was 68 (32 among them were unlearned), the number of persons' names was 33 (15 among them were unlearned), and a threshold was 0.0 to 1.0. The number of persons registered in a language model within a class was 15, 33, and 133. In the evaluation, a person's name was used as a class word.

FIG. 7 illustrates an example of an evaluation result. In FIG. 7, TotalCER is an overall error rate (%), class CER is an error rate (%) with respect to a class word for which customization is desired, and outside class CER is an error rate (%) with respect to the others. DNN-HMM is a customizable conventional method and a reference value. E2E baseline is a speech recognition result that cannot be customized by a conventional method and is a comparative example.

As illustrated in FIG. 7, in the case of 33 persons, which is an example in which persons' names are registered without excess or shortage in a language model within a class, the error rate can be improved compared to other numbers of persons registered. Furthermore, in this case, even if the threshold is varied from 0 to 1.0, the error rate is low at any threshold.

In contrast, in the case of 15 persons (short by 18 persons), which is an example of insufficient registration of persons' names in a language model within a class, the error rate is higher than that of the case where 33 persons are registered. However, by setting the threshold to about 0.8, the error rate can be improved compared to the conventional method.

In the case of 133 persons, which is an example in which too many persons' names are registered in a language model within a class, even if the threshold is changed, the error rate does not change much.

In this way, in the evaluation, whether the number of persons' names registered in a language model within a class is appropriate, insufficient, or excessive, by setting the threshold for the similarity to about 0.8, the error rate of a customization target can be improved.

A program for realizing all or some of the functions of the speech recognition device 1 in the disclosure may be recorded on a computer-readable recording medium, and part or all of the processing performed by the speech recognition device 1 may be performed by having a computer system read and execute the program recorded on the recording medium. The "computer system" mentioned here includes hardware such as an OS or peripheral devices. In addition, the "computer system" also includes a WWW system having a homepage providing environment (or display environment). The "computer-readable recording medium" refers to a storage device, such as a portable medium such as a flexible disk, a magneto-optical disk, a ROM and a CD-ROM, or a hard disk built in the computer system, and so on. Furthermore, the "computer-readable recording medium" also includes those holding a program for a fixed time, such as a volatile memory (RAM) in the computer system serving as a server or a client in the case where the program is transmitted via a network such as the Internet or a communication line such as a telephone line.

The above program may be transmitted from a computer system in which the program is stored in the storage device or the like to another computer system via a transmission medium or by a transmission wave in the transmission medium. Herein, the "transmission medium" that transmits the program refers to a medium having a function of transmitting information, like a network (communication network) such as the Internet or a communication line such as a telephone line. The above program may be for realizing some of the aforementioned functions. Furthermore, the above program may be a so-called differential file (differential program) capable of realizing the aforementioned functions by combination with a program already recorded in the computer system.

Although the embodiments for carrying out the disclosure have been described above by way of embodiments, the disclosure is not limited to these embodiments at all, and various modifications and replacements may be made without deviating from the gist of the disclosure.

What is claimed is:

1. A speech recognition device, comprising:

an acquisition part, acquiring a speech signal;

a speech feature amount calculation part, calculating a speech feature amount of the acquired speech signal;

a first speech recognition part, based on the speech feature amount, performing speech recognition using a first end-to-end model that has been learned, attaching a first tag to a vocabulary portion of a specific class in a text that is a recognition result, and outputting the vocabulary portion with the first tag;

a second speech recognition part, based on the speech feature amount, performing speech recognition using a second end-to-end model that has been learned, attaching a second tag to a vocabulary portion of a specific class in a phoneme that is a recognition result, and outputting the phoneme with the second tag;

a phoneme replacement part, replacing the vocabulary portion with the first tag in the text recognized by the first speech recognition part with the phoneme with the second tag; and an output part, converting the phoneme with the second tag obtained by replacement by the phoneme replacement part into a text and outputting the converted text, wherein, in response to a text with a highest similarity in a language model in which text and phonemes are associated has the similarity greater than a threshold, the output part converts and outputs the phoneme with the second tag obtained by replacement by the phoneme replacement part; and in response to the text with highest similarity in a language model stored in a language model storage part has the similarity equal to or less than a threshold, the output part outputs the phoneme with the second tag obtained by replacement by the phoneme replacement part as the text with the first tag recognized by the first speech recognition part as it is.

2. The speech recognition device according to claim 1, wherein the output part converts the phoneme with the second tag obtained by replacement by the phoneme replacement part into a text with a highest similarity in a language model in which text and phonemes are associated.

3. The speech recognition device according to claim 1, wherein the first end-to-end model is learned using a speech signal and text data for each utterance unit; and the second end-to-end model is learned using a speech signal and phoneme data for each utterance unit.

4. The speech recognition device according to claim 2, wherein the first end-to-end model is learned using a speech signal and text data for each utterance unit; and the second end-to-end model is learned using a speech signal and phoneme data for each utterance unit.

5. The speech recognition device according to claim 1, wherein, in response to there being a plurality of vocabulary portions of the specific class with the first tag in the text outputted by the first speech recognition part, the phoneme replacement part replaces a first vocabulary portion of the specific class with the first tag with the phoneme with the second tag.

6. The speech recognition device according to claim 2, wherein, in response to there being a plurality of vocabulary portions of the specific class with the first tag in the text outputted by the first speech recognition part, the phoneme replacement part replaces the first vocabulary portion of the specific class with the first tag with a phoneme with the second tag.

7. The speech recognition device according to claim 1, wherein the vocabulary portion of the specific class is at least one proper noun of a person's name, a department name, a product name, a model name, a part name, and a place name.

8. The speech recognition device according to claim 2, wherein the vocabulary portion of the specific class is at least one proper noun of a person's name, a department name, a product name, a model name, a part name, and a place name.

9. A speech recognition method, comprising:

by an acquisition part, acquiring a speech signal;

by a speech feature amount calculation part, calculating a speech feature amount of the acquired speech signal;

by a first speech recognition part, based on the speech feature amount, performing speech recognition using a first end-to-end model that has been learned, attaching a first tag to a vocabulary portion of a specific class in a text that is a recognition result, and outputting the vocabulary portion with the first tag;

by a second speech recognition part, based on the speech feature amount, performing speech recognition using a second end-to-end model that has been learned, attaching a second tag to a vocabulary portion of a specific class in a phoneme that is a recognition result, and outputting the phoneme with the second tag;

by a phoneme replacement part, replacing the vocabulary portion with the first tag in the text recognized by the first speech recognition part with a phoneme with the second tag; and by an output part, converting the phoneme with the second tag obtained by replacement by the phoneme replacement part into a text and outputting the converted text, wherein, in response to a text with a highest similarity in a language model in which text and phonemes are associated has the similarity greater than a threshold, the output part converts and outputs the phoneme with the second tag obtained by replacement by the phoneme replacement part; and in response to the text with highest similarity in a language model stored in a language model storage part has the similarity equal to or less than a threshold, the output part outputs the phoneme with the second tag obtained by replacement by the phoneme replacement part as the text with the first tag recognized by the first speech recognition part as it is.

10. A non-transitory computer-readable medium storing a program, the program causing a computer to:

acquire a speech signal;

calculate a speech feature amount of the acquired speech signal;

based on the speech feature amount, perform speech recognition using a first end-to-end model that has been learned, attach a first tag to a vocabulary portion of a specific class in a text that is a recognition result, and output the vocabulary portion with the first tag;

based on the speech feature amount, perform speech recognition using a second end-to-end model that has been learned, attach a second tag to a vocabulary portion of a specific class in a phoneme that is a recognition result, and output the phoneme with the second tag;

replace the vocabulary portion with the first tag in the text recognized using the first end-to-end model with the phoneme with the second tag; and convert the phoneme with the second tag obtained by replacement into a text and output the converted text, wherein, in response to a text with a highest similarity in a language model in which text and phonemes are associated has the similarity greater than a threshold, the computer converts and outputs the phoneme with the second tag obtained by replacement by the phoneme replacement part; and in response to the text with highest similarity in a language model stored in a language model storage part has the similarity equal to or less than a threshold, the computer outputs the phoneme with the second tag obtained by replacement by the phoneme replacement part as the text with the first tag recognized by the first speech recognition part as it is.

* * * * *